(12) United States Patent
O'Donnell et al.

(10) Patent No.: US 11,531,338 B2
(45) Date of Patent: Dec. 20, 2022

(54) AUTOMATIC CONTROL MODE SYSTEM FOR HEAVY MACHINERY

(71) Applicant: Caterpillar Paving Products Inc., Brooklyn Park, MN (US)

(72) Inventors: Timothy M. O'Donnell, Long Lake, MN (US); Kyle D. Hendricks, St. Francis, MN (US); Robert J. McGee, Peoria, IL (US); John L. Marsolek, Watertown, MN (US); Sangameshwar Sonth, Dunlap, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 110 days.

(21) Appl. No.: 16/811,089

(22) Filed: Mar. 6, 2020

(65) Prior Publication Data
US 2021/0278838 A1    Sep. 9, 2021

(51) Int. Cl.
| | |
|---|---|
| *G05D 1/00* | (2006.01) |
| *B60W 60/00* | (2020.01) |
| *G05D 1/02* | (2020.01) |
| *E01C 19/00* | (2006.01) |
| *E01C 19/26* | (2006.01) |

(52) U.S. Cl.
CPC ........ *G05D 1/0061* (2013.01); *B60W 60/0053* (2020.02); *G05D 1/0214* (2013.01); *B60W 2300/17* (2013.01); *E01C 19/004* (2013.01); *E01C 19/262* (2013.01); *G05D 2201/0202* (2013.01)

(58) Field of Classification Search
CPC .............. G05D 1/0061; G05D 1/0214; G05D 2201/0202; B60W 60/0053; B60W 2300/17; E01C 19/262; E01C 19/004
See application file for complete search history.

(56) References Cited

U.S. PATENT DOCUMENTS

| | | | |
|---|---|---|---|
| 9,868,446 B1 | 1/2018 | Zhu et al. | |
| 10,029,701 B2 | 7/2018 | Gordon et al. | |
| 10,137,887 B2* | 11/2018 | Upadhyay | B60N 2/26 |
| 10,913,464 B1* | 2/2021 | Qiao | B60W 60/0016 |
| 2015/0094898 A1* | 4/2015 | Tellis | B60W 40/12 701/23 |
| 2017/0212512 A1* | 7/2017 | Schmid | B60W 50/08 |
| 2018/0059664 A1* | 3/2018 | Jang | B60W 30/00 |
| 2018/0178834 A1* | 6/2018 | Moreillon | B62D 5/0463 |
| 2018/0181135 A1 | 6/2018 | Urano | |

(Continued)

FOREIGN PATENT DOCUMENTS

| | | | | |
|---|---|---|---|---|
| DE | 102013205018 A1 * | 9/2013 | | B60W 30/12 |
| DE | 102014215276 A1 * | 2/2016 | | B60W 30/182 |

(Continued)

*Primary Examiner* — Rodney A Butler
(74) *Attorney, Agent, or Firm* — Bookoff McAndrews, PLLC

(57) ABSTRACT

An automatic control mode system for heavy machinery and a method for controlling heavy machinery for an automatic control mode is disclosed. The method may include: monitoring one or more conditions of one or more systems of the heavy machinery for the automatic control mode; determining whether at least one of the one or more conditions is met; and disabling the automatic control mode if at least one of the one or more conditions are met.

20 Claims, 4 Drawing Sheets

(56) References Cited

U.S. PATENT DOCUMENTS

| | | | |
|---|---|---|---|
| 2018/0215393 A1 | 8/2018 | Miyakubo et al. | |
| 2018/0275652 A1* | 9/2018 | Kuwahara | B62D 15/025 |
| 2018/0283859 A1* | 10/2018 | Williams | B60P 1/267 |
| 2019/0000007 A1* | 1/2019 | Schleicher | A01B 69/008 |
| 2019/0382005 A1 | 12/2019 | Nishi et al. | |
| 2020/0050192 A1 | 2/2020 | O'Donnell et al. | |
| 2020/0130622 A1* | 4/2020 | Lerner | G01C 21/3697 |
| 2020/0164895 A1* | 5/2020 | Boss | G05D 1/0088 |

FOREIGN PATENT DOCUMENTS

| | | | |
|---|---|---|---|
| KR | 10-2019-0116192 A | 10/2019 | |
| KR | 10-2027121 B1 | 10/2019 | |
| WO | 2015/119264 A1 | 8/2015 | |
| WO | WO-2019215017 A1 * | 11/2019 | B60W 40/06 |

\* cited by examiner

AUTOMATIC CONTROL MODE SYSTEM FOR HEAVY MACHINERY

TECHNICAL FIELD

The present disclosure relates generally to heavy machinery or equipment, and more particularly, to an automatic control mode system for heavy machinery.

BACKGROUND

Construction projects such as road building projects require various machines, such as heavy machinery or equipment, and extensive procedures to complete tasks of the construction project. Such machines may include autonomous and/or semi-autonomous heavy machinery that may enable complex tasks of the project to be completed more consistently, precisely, and in a more timely manner than manual operation of the heavy machinery. However, autonomous and/or semi-autonomous heavy machines require complex systems and require extensive monitoring of system and machine performance. Autonomous and semi-autonomous heavy machinery may further include unique challenges from other types of autonomous vehicles (e.g., road vehicles, such as cars, trucks, or the like) due to, for example, limited and/or defined movement areas of a work space and variation in slopes of the ground surface at the work space.

Some types of autonomous and semi-autonomous heavy machinery may require a location determination system with high accuracy or precision for efficiently and accurately operating the heavy machinery within a work area. However, current autonomous and semi-autonomous heavy machinery may enable autonomous mode to continue with reduced accuracy or accuracy below high accuracy. Further, autonomous and semi-autonomous heavy machinery may require an operator to be present on the heavy machinery and/or to use a remote device to manually monitor the system and machine performance during automatic control of the heavy machinery.

WIPO Publication No. 2015/119264, published on Aug. 13, 2015 ("the '264 publication"), describes a remote operation device for a parallel travel work system. The system includes an autonomous travel work vehicle provided with a position calculation means that measures the device body position by means of a satellite positioning system. The autonomous vehicle of the '264 publication can autonomously travel along a set travel path. Further, the '264 publication discloses that autonomous travel of the vehicle may be interrupted under certain conditions. The conditions may include an abnormal GPS signal such as the number of satellites from which the GPS is receiving signals is less than a threshold, and the signal strength is less than a predetermined strength. Further, the conditions may include interrupting the autonomous travelling if the vehicle deviates from a set travel path by a threshold amount. However, the system of the '264 publication does not require high accuracy position determination and does not address automatically ending the autonomous control based on loss of high accuracy and/or if the vehicle travels outside a work area.

The systems and methods of the present disclosure may address or solve one or more of the problems in the art. The scope of the current disclosure, however, is defined by the attached claims, and not by the ability to solve any specific problem.

SUMMARY

In one aspect, a method for controlling heavy machinery for an automatic control mode is disclosed. The method may include: monitoring one or more conditions of one or more systems of the heavy machinery for the automatic control mode; determining whether at least one of the one or more conditions is met; and disabling the automatic control mode if at least one of the one or more conditions are met.

In another aspect, a method for controlling heavy machinery for an automatic control mode is disclosed. The method may include: monitoring one or more positional conditions of a positioning receiver system of the autonomous vehicle for the automatic control mode; determining whether at least one of the positional conditions is met; and disabling the automatic control mode if at least one of the positional conditions is met.

In yet another aspect, an automatic control mode system for heavy machinery is disclosed. The system may include: one or more positioning receivers of the heavy machinery; and a controller. The controller may be configured to: monitor an accuracy provided by the positioning receivers for the automatic control mode; determine whether the accuracy is less than a threshold; and disable the automatic control mode if the accuracy is less than a threshold.

BRIEF DESCRIPTION OF THE DRAWINGS

The accompanying drawings, which are incorporated in and constitute a part of this specification, illustrate various exemplary embodiments and together with the description, serve to explain the principles of the disclosure.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Further, relative terms, such as, for example, "about," "substantially," "generally," and "approximately" are used to indicate a possible variation of ±10% in a stated value.

Figure 1:
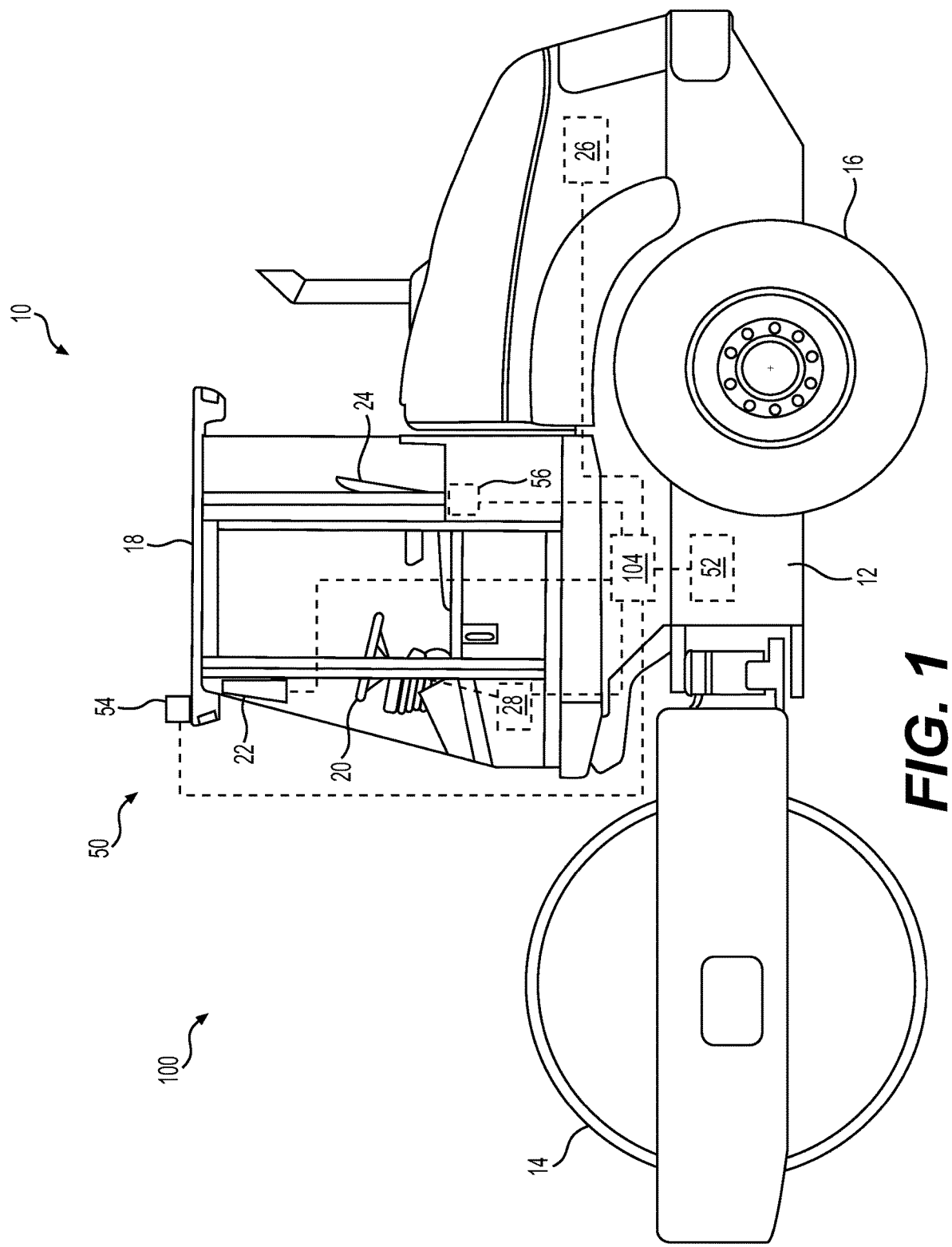
FIG. 1 illustrates a schematic side view of an exemplary heavy machinery including an automatic control mode system, according to aspects of the disclosure.

FIG. 1 illustrates a schematic side view of an exemplary compactor 10 including an automatic control mode system 100, according to aspects of the disclosure. As used herein, heavy machinery or heavy equipment includes any vehicles for executing construction tasks, such as earthwork operations or other construction tasks. In the exemplary embodiment, heavy machinery may include a compactor 10 for use in compacting a work area. However, in general, the current disclosure can be applied as to any heavy machinery or heavy equipment, such as, for example, a paver finisher, rotary mixer, a wheel loader, a motor grader, a backhoe loader, or any another machine or vehicle that may be used at a work area.

Compactor 10 may include a frame 12 attached to ground-engaging mechanisms such as a drum 14 and wheels 16. Frame 12 may support a cab 18, from which a user, or operator, may maneuver and control compactor 10 via user interfaces and displays. The user interfaces may include a steering device 20, such as a steering wheel and/or joysticks, and a display 22, such as a touch-screen display device, keypad with buttons, or the like. Cab 18 may also include a seat 24 to support and position an operator in cab 18 for controlling compactor 10. Frame 12 may also support components of a propulsion system 26 (shown schematically in FIG. 1) for propelling compactor 10 about a ground surface. Propulsion system 26 may include, for example, engines, motors, batteries, and/or any other equipment necessary to power, move, and/or operate compactor 10.

Figure 2:
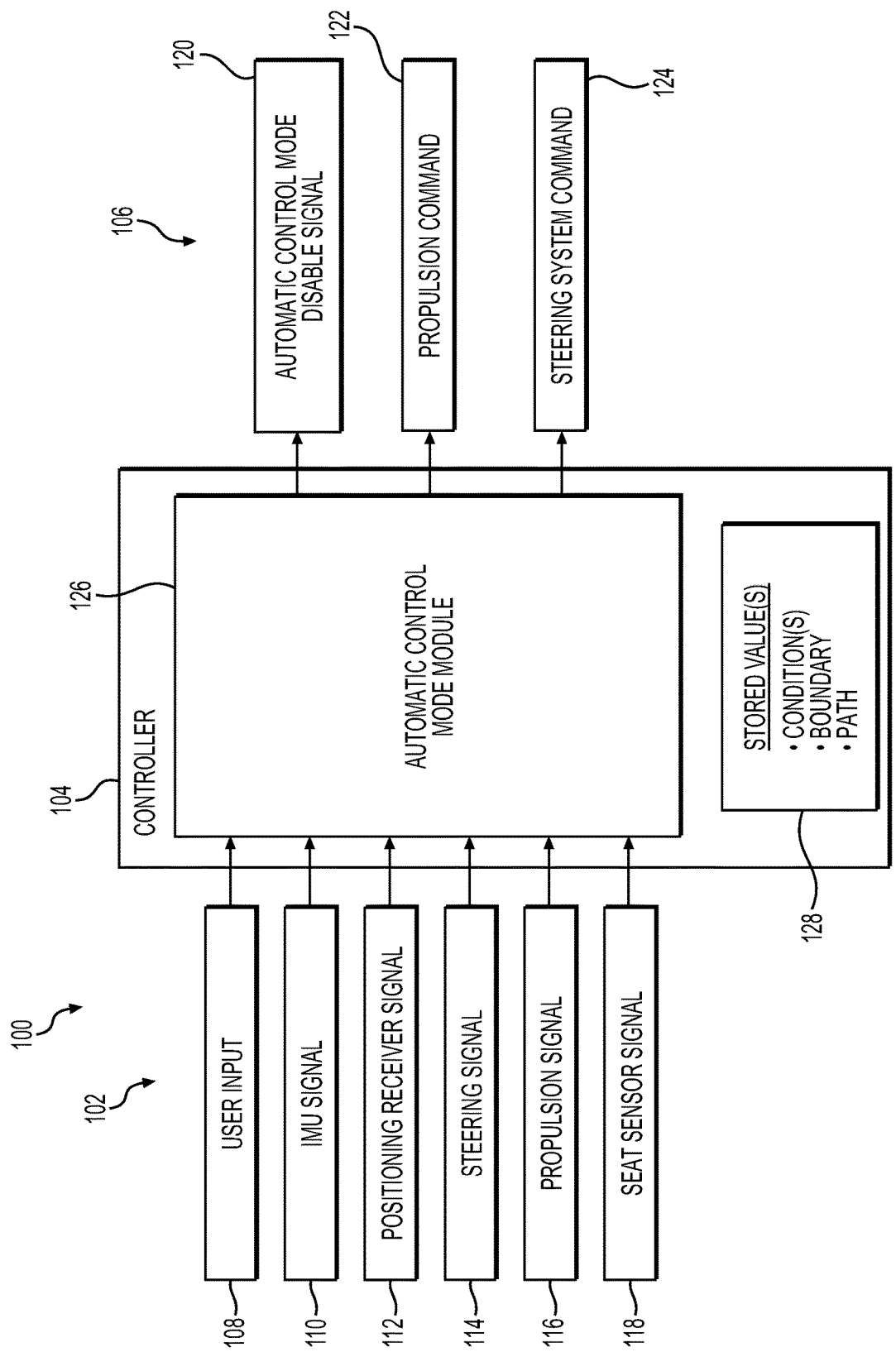
FIG. 2 illustrates a schematic view of the automatic control mode system of FIG. 1.

Compactor 10 may further include an automatic control mode system 100, as described in detail in FIG. 2, for automatically and/or semi-automatically controlling aspects of compactor 10. As used herein, the terms automated, autonomous, automatic, semi-autonomous, and/or semi-automatic are used to describe functions that are done without, or with minimal, user intervention. For example, automatic or semi-automatic may include automatic control of certain aspects of compactor 10 while requiring user input 108 to verify a user is present in cab 18 (or via a remote device) to monitor the automatic control mode. Alternatively, or additionally, the user may be remote from compactor 10 and the user input 108 may be received from a remote device. The various steps of methods 300, 400, described below, may proceed without, or with minimal, user intervention.

As shown in FIG. 1, automatic control mode system 100 may include a controller 104, such as an electronic control module, a sensor system 50, and one or more systems 26, 28 of compactor 10. Sensor system 50 may include one or more pitch and roll sensors, such as an inertial measurement unit (IMU) 52 or inclinometer, a positioning receiver 54, and/or a seat sensor 56 in communication with controller 104 (as shown in FIG. 1 by the dashed lines). Sensors 52, 54, 56 may communicate with controller 104 through wired communication lines and/or through wireless means.

IMU 52 may include one or more accelerometers, gyroscopes, and/or other sensors for sensing, measuring, or otherwise determining an orientation of compactor 10. For example, IMU 52 may measure an angle of slope (e.g., a pitch and/or roll) of compactor 10 on a three-dimensional axis with respect to a direction of gravity. It is understood that IMU 52 may embody a single sensor and/or multiple sensors attached to compactor 10 in any location and may include any type of sensor for sensing, measuring, or otherwise determining a pitch and/or roll of compactor 10 with respect to gravity's direction.

Positioning receiver 54 may include any type of sensor for sensing, measuring, calculating, or otherwise determining a geographical position (e.g., a geolocation) of compactor 10. For example, positioning receiver 54 may include a global positioning system (GPS) receiver in communication with a global navigation satellite system (GNSS) for receiving a geolocation from the GNSS. Positioning receiver 54 may include a high accuracy system for precisely calculating geographic locations of the positioning receiver 54 within sub-meter to centimeter accuracy. As used herein, high accuracy is when the calculated geolocation of the positioning receiver 54 is within a threshold range of the actual geolocation of the positioning receiver 54. For example, the threshold for high accuracy may be within three centimeters or less. In one embodiment, high accuracy of positioning receiver 54 may be achieved with real-time kinematic (RTK) positioning including a stationary base station (not shown) located at, or near (e.g., within 20 kilometers), the work area. The positioning receiver 54 may communicate with the base station through, for example, radio signals, and the base station may communicate with the GNSS system for providing geolocation of compactor 10 to positioning receiver 54 with high accuracy. It is understood that positioning receiver 54 may include one or more positioning receivers 54 positioned on compactor 10 in any location and may include any type of sensor (e.g., cellular, Wi-Fi, Bluetooth, etc.) for sensing, measuring, calculating, or otherwise determining a geolocation of compactor 10 with high accuracy.

Seat sensor 56 may include a pressure sensor or the like for sensing an operator in seat 24. For example, seat sensor 56 may sense, measure, or otherwise determine a weight (e.g., weight of the operator) applied on seat 24. Additionally, or alternatively, seat sensor 56 may include a seat belt sensor, such as a magnetic, or electromagnetic, switch sensor for detecting when a male component of the seat belt is inserted and secured into a female component. It is understood that seat sensor 56 may include one or more seat sensors 56 and may include any type of sensor for sensing or otherwise determining when an operator is in seat 24 and/or when the seat belt is secured.

Sensor system 50 may include any other type of sensor for sensing or measuring information related to compactor 10 and providing the information to controller 104. For example, sensor system 50 may include an object detection sensor, such as a radar, or the like.

The one or more systems 26, 28 of compactor 10 may include propulsion system 26 and a steering system 28 (shown schematically in FIG. 1) in communication with controller 104 (as shown in FIG. 1 by dashed lines). Systems 26, 28 may communicate with controller 104 through wired communication lines and/or through wireless means. Controller 104 may automatically, or semi-automatically, control aspects of systems 26, 28, as detailed below. Propulsion system 26 may include a source of power (e.g., engine, motor, batteries, or the like) and may convert the power to motion of compactor 10 through axles (not shown) and wheels 16 such that compactor 10 may be propelled or otherwise moved about the ground surface. Steering system 28 may include the steering device 20 and a system of gears (not shown), joints (not shown), and other components to control a direction of the motion of compactor 10. Thus, steering system 28 may convert rotation and/or motion of steering device 20 into a swiveling movement of wheels 16 for steering compactor 10. It is understood that compactor 10 may include any other type of system for controlling aspects of compactor 10. For example, compactor 10 may include a vibration system (not shown) for providing a vibration on ground surface through drum 14, a speed system for monitoring a speed and/or velocity of compactor 10, or any other system for controlling aspects of compactor 10.

Automatic control mode system 100 may further include display 22 for displaying information related to compactor 10 and receiving input from a user, such as an operator of compactor 10. Display 22 may be in communication with controller 104 through wired communication and/or wireless means. Controller 104 may display an "Auto" button, or similar interface, on display 22 such that an operator may activate the "Auto" button to enter the automatic control mode. Controller 104 may also prompt the operator to touch the display 22, push a button, or otherwise send a user input 108 to controller 104 to verify that a user is present in the cab 18, as detailed further below. Thus, display 22 may enable an operator to semi-automatically control aspects of compactor 10, as detailed below.

FIG. 2 illustrates a schematic view of the automatic control mode system 100 for operation and/or control of at least portions of compactor 10. Automatic control mode system 100 may include inputs 102, controller 104, and outputs 106. Inputs 102 may include a user input 108, IMU signal 110, positioning receiver signal 112, steering signal 114, propulsion signal 116, and seat sensor signal 118. Output 106 may include, for example, an automatic control mode disable signal 120, propulsion command 122, and steering command 124.

Controller 104 may embody a single microprocessor or multiple microprocessors that may include means for controlling aspects of compactor 10. For example, controller 104 may include a memory (e.g., a non-volatile memory), a secondary storage device, a processor, such as a central processing unit or any other means for accomplishing a task consistent with the present disclosure. The memory or secondary storage device associated with controller 104 may store data and/or software routines that may assist controller 104 in performing its functions. Further, the memory or secondary storage device associated with controller 104 may also store data received from the various inputs 102 associated with automatic control mode system 100. Numerous commercially available microprocessors can be configured to perform the functions of controller 104. It should be appreciated that controller 104 could readily embody a general machine controller capable of controlling numerous other heavy machinery functions. Various other known circuits may be associated with controller 104, including signal-conditioning circuitry, communication circuitry, hydraulic or other actuation circuitry, and other appropriate circuitry.

User input 108 may include input received from display 22. User input 108 may also include input received from steering device 20 and/or any other user interface and/or device Controller 104 may receive user input 108 through manual controls, such as, for example, joysticks, keypads, acceleration and/or brake pedals, emergency stop button or interface, park brake, or any other user interface and/or device. Input received from display 22 may include, for example, signals from a touchscreen and/or buttons on, or otherwise associated with, display 22. User input 108 may include user activation and/or deactivation of the "Auto" button and/or response to the displayed prompt for user input from controller 104, as detailed further below.

IMU signal 110 may include a signal communicated from IMU 52 to controller 104. The signal may include a pitch and/or roll signal indicative of a pitch and/or roll of compactor 10. For example, controller 104 may receive values of pitch and roll from IMU 52 and/or may receive other values, such as accelerations in the x, y, z directions to determine pitch and roll of compactor 10. Controller 104 may also derive pitch and roll of compactor 10 from other sources, including other sensors.

Positioning receiver signal 112 may include a signal associated with a geolocation of compactor 10 communicated from positioning receiver 54 to controller 104. For example, positioning receiver 54 may receive, measure, and/or determine the geolocation, as detailed above, and may communicate the geolocation to controller 104. Based on the signal 112, controller 104 may determine the accuracy provided by positioning receiver 54. For example, high accuracy provided by positioning receiver 54 may correspond to a communication signal between positioning receiver 54 and the ground station. If positioning receiver 54 is communicating only with the GNSS directly, rather than through the base station, controller 104 may determine that the accuracy provided by positioning receiver is not high accuracy (e.g., the accuracy is low accuracy). Thus, high accuracy may include a threshold communication signal and controller 104 may determine that positioning receiver 54 is operating with, or providing, high accuracy if the communication signal of positioning receiver 54 exceeds the threshold. For example, controller 104 may determine the accuracy of positioning receiver 54 based on the communication signal (e.g., signal strength) between positioning receiver 54 and the base station. Controller 104 may also derive geolocation of compactor 10 from other sources, including other sensors.

Steering signal 114 may include a signal communicated from steering system 28 to controller 104. Steering signal 114 may be indicative of a steering function of compactor 10. For example, steering signal 114 may communicate an amount of steering motion and/or steering force being applied through steering system 28 to controller 104. Steering signal 114 may be derived through manual control (e.g., such as by an operator turning or otherwise using steering device 20) and/or through automatic control through controller 104 (via steering system command output 124), as detailed below.

Propulsion signal 116 may include a signal communicated from propulsion system 26 to controller 104. Propulsion signal 116 may be indicative of a propulsion function of compactor 10. For example, propulsion signal 116 may communicate a power output, or an amount of propulsion, of propulsion system 26 to controller 104. Propulsion signal 116 may also include speed information of compactor 10. Propulsion signal 116 may be derived through manual control (e.g., such as by an operator using acceleration/brake pedals, or the like), and/or may be automatically controlled through controller 104 (via propulsion system command output 122), as detailed below.

Seat sensor signal 118 may include a signal communicated from seat sensor 56 to controller 104. Seat sensor signal 118 may be indicative of a weight applied on seat 20 (e.g., from a pressure sensor) and/or of a detected change in electromagnetic field when the male component of the seat belt is inserted into the female component. For example, seat sensor 56 may communicate a pressure and/or weight applied to seat 20 to controller 104 and if the pressure and/or weight exceeds a threshold, controller 104 may determine that an occupant is in seat 20. Further, seat sensor 56 may communicate the change in electromagnetic field to controller 104, and controller 104 may determine that the seat belt is secured (e.g., the male component has been inserted into the female component).

For outputs of system 100, automatic control mode disable signal 120 may include automatically disabling an automatic control mode of compactor 10, as detailed further below. For example, when compactor 10 is operating in the automatic control mode, the disable signal 120 may disable the automatic control mode such that an operator may manually control compactor 10 (e.g., in a manual control mode). Further, during the manual control mode, the disable signal 120 may prevent an operator from entering the automatic control mode, as detailed further below.

Propulsion command 122 may control propulsion system 26 to automatically propel or otherwise move compactor 10 about the ground surface. For example, propulsion command 122 may control the engine, motor, batteries, etc. to control the power output to provide motion to the wheels 16 to move compactor 10 at a desired speed. Steering command 124 may control steering system 28 to automatically maneuver or otherwise maneuver compactor 10 about the ground surface. For example, steering command 124 may control the gear, joints, and/or other components of steering system 28 to control the swiveling movement of wheels 16 for steering compactor 10.

Controller 104 may also include an automatic control mode module 126 and one or more stored values 128. Automatic control mode module 126 may receive inputs 102, implement methods 300, 400 for controlling compactor 10, and control outputs 106, as described with reference to FIGS. 3 and 4 below. The stored values 128 may include values stored in the memory of controller 104. The stored values 128 may include, for example, one or more conditions, one or more boundaries, and one or more paths of compactor 10. The one or more conditions may include conditions that trigger the automatic control mode disable signal 120, as detailed below. The conditions may also include thresholds for various systems and/or sensors of compactor 10. For example, the thresholds may include first thresholds for pitch and roll and second thresholds for pitch and roll. The thresholds may also include an accuracy threshold of positioning receiver 54, as described above. The one or more boundaries may include a user defined boundary of a work area for operating the automatic control mode in the work area, as detailed below. The one or more paths may include travel paths within each boundary generated by controller 104 for maneuvering compactor 10 about the work area.

INDUSTRIAL APPLICABILITY

The disclosed aspects of automatic control mode system 100 of the present disclosure may be used for any type of heavy machinery or heavy equipment that is used at a work area.

Referring to FIG. 1, during manual operation of compactor 10, an operator may maneuver compactor 10 about a ground surface by controlling aspects of propulsion system 26 and steering system 28, as described above. Further, the operator may maneuver compactor 10 to initially generate or define a boundary of a desired work area. For example, as operator moves compactor 10 about a perimeter of a desired work area, positioning receiver 54 may record, or store, a path travelled by compactor 10 to generate the boundary of the work area. Thus, the boundary may define a perimeter of the desired work area. Controller 104 may then generate one or more paths within the boundary for maneuvering compactor 10 along the one or more paths (e.g., manually and/or automatically) to complete tasks within the work area. The paths may also correspond to areas within the boundary in which the vibration system of compactor 10 is activated (e.g., vibration is on) for providing a desired compacting operation of compactor 10. Controller 104 may display the boundary and paths on display 22 for viewing by the operator. When the boundary and/or paths have been defined, the operator may desire to manually control compactor 10 to complete the task at the work site by following the paths generated by controller 104.

Alternatively, or additionally, the operator may desire to use the automatic control mode system 100 such that controller 104 automatically, or semi-automatically, controls aspects of compactor 10 to complete the tasks at the work site. For example, controller 104 may automatically control propulsion system 26, steering system 28, and/or any other system of compactor 10 (e.g., the vibration system) to maneuver compactor 10 about the work area to complete any tasks (e.g., compacting the work area). To enter the automatic control mode and/or during the automatic control mode, controller 104 may perform a series of checks to determine if one or more certain conditions of the systems of compactor 10 are met or exist, as described below with reference to FIG. 3. While the compactor 10 is operating in manual control mode, if certain conditions are met, controller 104 will not enable the automatic control mode. When the conditions are not met (as detailed below), controller 104 may display an "Auto" button on display 22 and user can push or otherwise activate the "Auto" button to enter automatic control mode. Additionally, or alternatively, if certain conditions are not met, controller 104 will not enable the automatic control mode and when the conditions are met, controller 104 may enable and/or enter the automatic control mode. It is understood that controller 104 may enter automatic control mode in various other ways than an "Auto" button and may enable and/or enter automatic control mode based on any type of condition and/or any number of conditions being met and/or not met.

Figure 3:
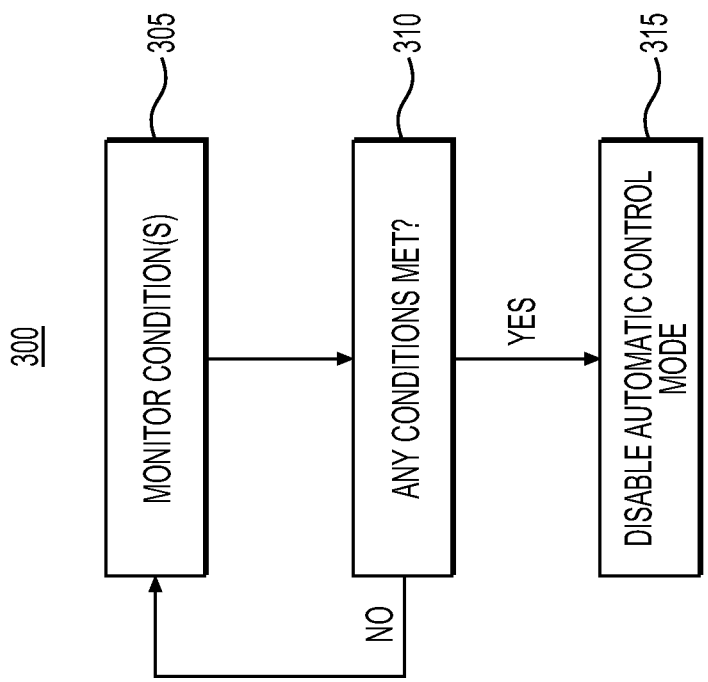
FIG. 3 provides a flowchart depicting a method for controlling the heavy machinery during an automatic control mode using the automatic control mode system of FIGS. 1 and 2.

FIG. 3 illustrates a flowchart depicting an exemplary method 300 for controlling compactor 10 for an automatic control mode using system 100. In the exemplary embodiment, method 300 may be performed while controller 104 is controlling compactor 10 in automatic control mode. However, method 300 may also be performed prior to controller 104 entering automatic control mode (e.g., during the manual control mode), to not allow for enabling of the automatic control mode. In an initial step 305, automatic control mode module 126 may monitor one or more conditions of one or more systems of compactor 10. For example, module 126 may receive the inputs 102, as detailed above, and determine the condition of each of the inputs 102. In the exemplary embodiment, the conditions may include, for example, thresholds for pitch and roll of compactor 10, accuracy of the positioning receiver 54, the boundary of the work area (generated as described above), a time taken for the compactor 10 to travel between reference points on a path, a threshold rate of change of the steering device 20, an operator in seat 25 (e.g., via seat senor 56 as detailed above), periodic user input (e.g., via user input 108), and/or any other conditions of any system of compactor 10.

In step 310, module 126 may determine whether any of the conditions are met and/or not met. For example, module 126 may determine whether pitch and/or roll of compactor 10 exceeds the first and/or second thresholds for pitch and roll, whether accuracy of positioning receiver is not high accuracy, whether compactor 10 is not within the boundary, whether the time taken for compactor 10 to travel between reference points on the path exceeds a threshold, whether the rate of change of steering device 20 exceeds the threshold, whether the operator is in the seat 24, and whether the periodic user input 108 is received. If all of the conditions are not met (step 310: NO), module 126 will enable and/or continue the automatic control mode and continue to monitor the one or more conditions (step 305).

In step 315, if any of the conditions are met (step 310: YES), module 126 will disable the automatic control mode. Additionally, or alternatively, if certain conditions are not met, controller 104 will disable the automatic control mode and as long as the conditions are met, controller 104 will continue the automatic control mode. As used herein, disabling the automatic control mode may include not enabling the automatic control mode during the manual control mode and/or disabling the automatic control mode while controller 104 is operating in the automatic control mode. Disabling the automatic control mode may also include module 126 sending a propulsion command 122 to propulsion system 26 and a steering command 124 to steering system 20 to stop motion, or movement, of compactor 10. Module 126 may also enable manual control mode such that an operator may then manually control compactor 10 when automatic control mode has been disabled.

In some embodiments, module 126 may output an alert if the pitch and/or roll exceeds the first thresholds for pitch and roll. Further, module 126 may disable the automatic control mode (step 315) if the pitch and/or roll exceeds the second thresholds for pitch and roll. Further, module 126 may disable the automatic control mode (step 315) if a rate of change of steering device 20 exceeds the threshold rate of change. For example, during the automatic control mode, incidental minor movement (e.g., movement below the threshold) of steering device 20 may occur as wheels 16 are moved while module 126 is controlling steering system 28. Thus, the rate of change of steering device 20 exceeding the threshold may indicate that an operator is moving steering device 20 rather than incidental minor movements of steering device 20. Module 126 may also disable the automatic control mode (step 315) if the operator is not in seat 24 (e.g., weight and/or pressure from seat sensor 56 does not exceed the threshold). Module 126 may also disable the automatic control mode (step 315) if module 126 does not receive the periodic user input 108. For example, module 126 may disable the automatic control mode if the operator does not respond to the prompt described above within a predetermined amount of time. It is understood that module 126 may monitor any other conditions and disable the automatic control mode based on any conditions, such as those conditions described below.

Figure 4:
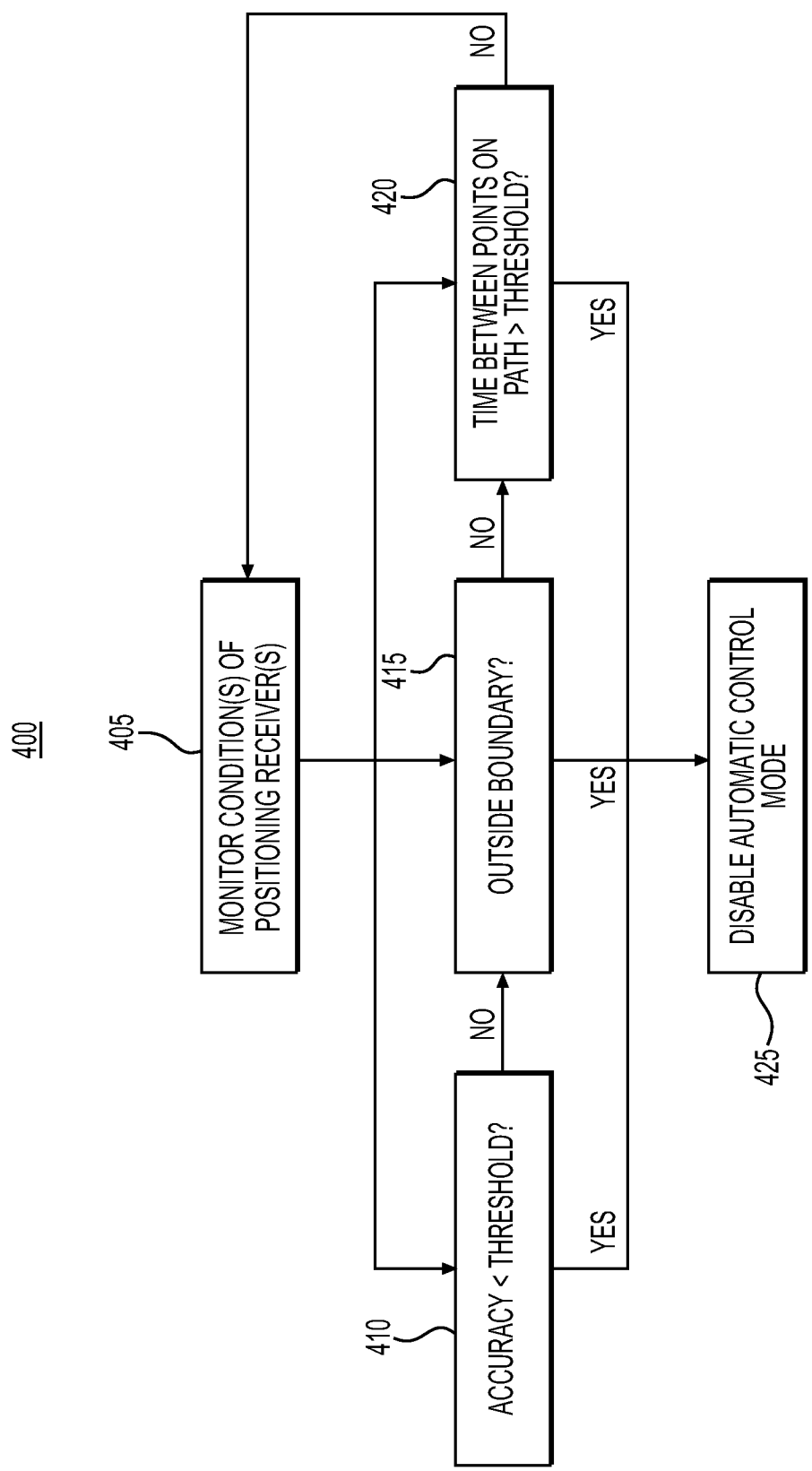
FIG. 4 provides a flowchart including a detailed implementation of performing the method of FIG. 3.

FIG. 4 provides a flowchart depicting a method 400 including a detailed implantation of performing method 300. As mentioned above, module 126 may monitor conditions of the positioning receiver 54 (step 405). For example, module 126 may monitor one or more positional conditions of positioning receiver 54. As detailed below, the positional conditions may include, for example, accuracy provided by the positioning receiver 54, location of compactor 10 with respect to a boundary, and/or time taken for compactor 10 to travel between points on a path. In steps 410-420, module 126 may determine if any of the conditions are met. In step 410, module 126 may determine whether the accuracy provided by positioning receiver 54 is less than a threshold. For example, the threshold may include a high accuracy communication signal threshold, as detailed above. If the accuracy exceeds the threshold (step 410: NO), the method 400 may proceed to step 415 and/or may continue to monitor the accuracy provided by positioning receiver 54 (step 405). For example, if positioning receiver 54 is communicating with the base station, module 126 may determine that the accuracy exceeds the threshold and positioning receiver 54 is providing high accuracy.

In step 425, if the accuracy is less than the threshold (e.g., accuracy is not high accuracy), module 126 will disable the automatic control mode, as detailed above. For example, if positioning receiver 54 is not communicating with the base station (e.g., communicating with only the satellites directly), module 126 may determine that the accuracy is less than the threshold and positioning receiver 54 is not providing high accuracy (e.g. providing low accuracy). Further, when compactor 10 includes two or more positioning receivers 54, module 126 will disable the automatic control mode (step 425) if the accuracy provided by at least one of the positioning receivers 54 is less than the threshold.

In step 415, module 126 may determine whether compactor 10, or a portion of compactor 10, is outside the boundary of the work area. For example, module 126 may monitor the current geolocation of the positioning receiver 54 and compare the current geolocation (e.g., determine with high accuracy) to the stored boundary. If compactor 10 is inside, or within, the boundary (step 415: NO), module 126 may proceed to step 420 and/or continue to monitor the current geolocation of positioning receiver 54 compared to the boundary (step 405). In step 425, if compactor 10, or a portion of compactor 10, is outside the boundary (step 415: YES), module 126 will disable the automatic control mode, as detailed above.

In step 420, module 126 may determine whether a time taken by compactor 10 to travel between two reference points on a path exceeds a threshold as compactor 10 travels along the path. For example, the path defined by controller 104 may include two or more reference points for compactor 10 to follow during the automatic control mode. The threshold may be indicative of an expected time between the two points for a given speed of compactor 10. If the time exceeds the threshold, it may indicate that the wheels 16 are slipping due to, for example, mud or other conditions at the work area and/or of the compactor 10. If the time travelled between the two points does not exceed the threshold (step 420: NO), module 126 may continue to monitor the time between subsequent points (step 405) as compactor 10 continues to travel along the path. In step 425, if the time travelled between the points exceeds the threshold (step 420: YES), module 126 will disable the automatic control mode, as detailed above.

It is understood that module 126 may monitor any other conditions of, or related to, positioning receiver 54 and disable the automatic control mode based on any other conditions.

Automatic control mode system 100 may allow for automatic disablement (e.g., and non-enablement) of the automatic control mode based on various conditions of various systems and/or sensors of compactor 10. For example, system 100 may require high accuracy of positioning receiver 54 for ensuring precise movement of compactor 10 within the boundary of the work area in order to complete tasks. Further, the thresholds of pitch and roll may ensure compactor 10 does not approach a tipping point during the automatic control mode due to more inclined areas of the ground surface. The seat sensor and the periodic user input requirements may ensure that an operator is present to monitor compactor 10 and manually override the automatic control mode if necessary. Thus, automatic control mode system 100 may monitor the automatic control mode of compactor 10 and disable the automatic control mode if certain conditions are present to safely, efficiently, and more precisely complete tasks at the work area.

It will be apparent to those skilled in the art that various modifications and variations can be made to the disclosed system without departing from the scope of the disclosure. Other embodiments of the disclosure will be apparent to those skilled in the art from consideration of the specification and practice of the invention disclosed herein. For example, the conditions may include any type of condition of any system of compactor 10, such as, emergency stop is inactive, keyswitch is on, park brake is disengaged, engine is running, the systems and/or sensors are not faulted (e.g., exceed a threshold fault level), propel joystick is in neutral, keypad buttons are not pressed or otherwise activated, no objects in path, compactor 10 is stopped (e.g., not being propelled about the ground surface or otherwise moving), and/or any other conditions of any other systems of compactor 10. The conditions may also include manual overrides (e.g., received via user input 108), such as, for example, automatic control mode stop button activated, emergency stop activated, park brake engaged, keypad buttons activated, steering device 20 rate of change exceeds a threshold, and/or any other manual overrides from user input 108. Further, in some embodiments, to enable the automatic control mode, controller 104 may display an indication of a location on a path with which compactor 10 must be aligned prior to enabling the automatic control mode. It is intended that the specification and examples be considered as exemplary only, with a true scope and spirit of the invention being indicated by the following claims.

What is claimed is:

1. A method for controlling heavy machinery for an automatic control mode, the method comprising:
    receiving one or more signals from one or more systems of the heavy machinery, the one or more signals including at least one value among a plurality of values associated with the one or more systems, the plurality of values including at least two of:
        a pitch and/or roll of the heavy machinery,
        a position of the heavy machinery determined by a position receiver system included in the one or more systems,
        an accuracy of the position determined by the position receiver system,
        a presence of an operator and/or an input by the operator, and
        a fault level and/or an on/off indication of the one or more systems; and
    upon determining, based on the received one or more signals, that (i) the at least one value is outside a threshold, (ii) one of the one or more systems has faulted, (iii) the operator has requested to override the automatic control mode, and/or (iv) that the operator is not present, disabling the automatic control mode.

2. The method of claim 1, wherein the one or more systems include:
    one or more pitch and/or roll sensors provided on the heavy machinery and configured to provide the pitch and/or roll of the heavy machinery,
    one or more positioning receivers provided on the heavy machinery and configured to provide the position of the heavy machinery, the accuracy provided by the positioning receivers,
    a user input provided in a cab and configured to receive input,
    an operator seat sensor configured to sense whether the operator is seated, and
    at least one of an engine system, a keyswitch system, and/or a park brake system, and wherein the method further includes:
        upon determining that the heavy machinery travels outside a boundary associated with a stored value, disabling the automatic control mode.

3. The method of claim 1, wherein the method includes determining a path for the heavy machinery within a boundary of a work area to complete one or more tasks within the working area, wherein the values include a time taken for the heavy machinery to travel between two reference points on the path of the heavy machinery, and the method further includes:
    upon determining that the time taken to travel between the reference points exceeds the threshold, disabling the automatic control mode.

4. The method of claim 1, including:
    upon determining that the pitch or roll exceed first thresholds, outputting an alert, and
    upon determining that the pitch or roll exceed second thresholds, disabling the automatic control mode.

5. The method of claim 2, wherein the values include a value indicating that an operator is not in the seat and an operator input, and the method further includes at least one of:
    upon determining that the operator is not in the seat, disabling the automatic control mode, or
    upon determining that the operator input is not received within a predetermined amount of time, disabling the automatic control mode.

6. The method of claim 1, wherein disabling the automatic control mode includes automatically stopping the heavy machinery and enabling manual control by an operator.

7. A method for controlling heavy machinery for an automatic control mode, the heavy machinery configured to perform a task in a working area, the method comprising:
    monitoring one or more positional conditions of a positioning receiver system of an autonomous vehicle for the automatic control mode, the one or more positional conditions including a calculated geolocation of the heavy machinery and an accuracy of the calculated geolocation, wherein the positioning receiver system is configured to receive signals directly from a first remote system, directly from a second remote system, or indirectly from the second remote system via the first remote system;
    determining whether an accuracy threshold is met, wherein determining whether the accuracy threshold is met includes determining which of the first and second remote systems the positioning receiver system is directly receiving signals from; and
    upon determining that the accuracy condition is not met, disabling the automatic control mode.

8. The method of claim 7, wherein the first remote system is a predetermined distance away from a generated boundary in which the heavy machinery travels, and the method further includes:
    determining at least one of:
        that the positioning receiver system is communicating directly with the second remote system, or
        a signal strength of a signal received from the first remote system does not exceed a predetermined signal strength threshold; and
    disabling the automatic control mode.

9. The method of claim 8, wherein:
    the positioning receiver signal is provided on the heavy machinery,
    the first remote system is within 20 kilometers of the generated boundary,
    the second remote system is a satellite system, and
    the positioning receiver system is configured to receive signals directly from the second remote system.

10. The method of claim 7, wherein the positional conditions include a boundary generated by the positioning receiver system, the first remote system being a predetermined distance away from the generated boundary, and the method further includes:
    generating the boundary using the positioning receiver system and a stored value, and upon determining that the heavy machinery travels outside the boundary, disabling the automatic control mode.

11. The method of claim 7, wherein the method includes determining a path for the heavy machinery within a boundary of a work area to complete one or more tasks within the working area, the boundary being generated by the position receiver system, wherein the positional conditions include a time taken for the heavy machinery to travel between two reference points on the path of the heavy machinery, and the method further includes:

upon determining that the time taken for the heavy machinery to travel between the references points exceeds a threshold, disabling the automatic control mode.

12. An automatic control mode system for heavy machinery configured to perform at least one task within a work area, comprising:

a position receiver system including one or more positioning receivers of the heavy machinery; and at least one controller configured to:
generate a boundary of a work area of the heavy machinery,
determine a path within the boundary to complete the one or more tasks,
monitor the position of the heavy machinery provided by the one or more positioning receivers,
monitor an accuracy of the position provided by the one or more positioning receivers,
determine whether the accuracy is less than a threshold, the threshold being a distance within the boundary; and
disable the automatic control mode upon determining that the accuracy is less than the threshold and/or that the heavy machinery has traveled outside the boundary.

13. The system of claim 12, wherein the controller is further configured to:

monitor a time taken for the heavy machinery to travel between two reference points on the path of the heavy machinery;
determine whether the time taken for the heavy machinery to travel between the two reference points on the path exceeds a threshold; and
disable the automatic control mode if the time taken to travel between the reference points exceeds the threshold.

14. The system of claim 12, wherein the one or more positioning receivers includes two or more positioning receivers, at least one positioning receiver being provided on the heavy machinery, and the controller is further configured to disable the automatic control mode if the accuracy provided by at least one of the positioning receivers is less than the threshold.

15. The method of claim 1, further comprising continuing the automatic control mode upon determining that at least one condition of a set of conditions is met based on the received signals, the set of conditions including:

the pitch and/or roll of the heavy machinery does not exceed a predetermined pitch and/or roll threshold, the position of the heavy machinery determined by the position receiver system is within a stored boundary,
the accuracy of the position determined by the position receiver system a predetermined accuracy threshold or greater,
the operator is seated,
a periodic input is received by the operator, and
none of the one or more systems exceed the fault level.

16. The method of claim 15, wherein the set of conditions further includes:

a time taken for the heavy machinery to travel between two or more reference points on a path does not exceed a time threshold, the path being based on a stored path within the stored boundary; and
a rate of change of a steering device does not exceed a rate of change threshold.

17. The method of claim 16, wherein the set of conditions further includes:

that an emergency brake of the heavy machinery is inactive or is not pressed,
that a keyswitch is on,
that a park brake is disengaged,
that an engine is running,
that the one or more systems are not faulted,
that a propel joystick is in neutral,
that one or more predetermined keypad buttons are not pressed or otherwise activated, and
that there are no objects detected in the path.

18. The system of claim 12, wherein the controller is further configured to:

monitor whether one or more systems of the heavy machinery has faulted,
determine whether a manual override signal has been received,
monitor whether one or more conditions has been met, the conditions including an accuracy condition that is met when the accuracy is greater than or equal to the threshold,
monitoring whether an operator has provided input within a predetermined time, and
disable the automatic control mode upon determining that (i) the one more systems has faulted, (ii) the manual override signal has been received, (iii) that the one or more conditions has not been met, or (iv) that the operator has not provided input within the predetermined time.

19. The system of claim 18, wherein:

the one or more conditions includes:
a pitch and/or roll condition that is met when the pitch and/or roll of the heavy machinery is less than or equal to a predetermined pitch and/or roll threshold, and
a boundary condition that is met when the heavy machinery is within the generated boundary; and
the one or more systems includes a pitch and/or roll sensor configured to determine the pitch and/or roll of the heavy machinery.

20. The system of claim 12, wherein the accuracy threshold is three centimeters.

* * * * *